Patented Feb. 22, 1927.

1,618,286

UNITED STATES PATENT OFFICE.

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE.

ZIRCONIUM COMPOUND AND METHOD OF MAKING SAME.

No Drawing. Application filed April 22, 1925. Serial No. 25,147.

My invention relates to obtaining zirconium compounds from materials containing same, as for example from the mineral baddeleyite, or from zircon (zirconium silicate $ZrSiO_4$) which occurs in nature in the form of crystalline sand deposits commingled or associated with other mineral substances such as ilmenite, rutile, monozite, etc., which also contain contaminating substances or minerals rendering the zircon concentrate and zirconium oxide undesirable for commercial uses; however the derivative compounds, when freed from such impurities, are adapted for various industrial purposes, such as an opaquing agent in the production of white enamels; also for use in paint pigments where intense whiteness is of primary importance.

The objects of my invention are, among other things, the provision of novel and simplified methods for converting zircon or zirconium silicate ($ZrSiO_4$) into an acid soluble compound which may thereafter be treated by solution processes to obtaining various zirconium compounds at much lower costs than heretofore possible.

Zircon occurs associated mechanically with zirconium oxide in the mineral baddeleyite; it has been known that if the mineral baddeleyite be treated with concentrated sulphuric acid at suitable temperatures, the $ZrO_2$ can be dissolved leaving the zirconium silicate as an insoluble residue, yet still contaminated with rutile if such were present. Heretofore in processes adapted for rendering baddeleyite available for industrial uses, such zircon has usually been discarded as being too difficult of conversion into soluble form.

Zirconium oxide occurring in nature is also associated with impurities such as iron, titanium, chromium, manganese, etc., which dissolve in sulphuric acid along with the zirconium, thereby rendering the subsequent separation of zirconium from the solution more difficult. Hence the industrial use of the natural silicate of zirconium in preference to the more impure oxide, because the silicate of zirconium usually exists in a far purer form. One method of chemically separating the zirconium silicate ($ZrSiO_4$) from its associated impurities has been described and claimed in U. S. Letters Patent of Louis E. Barton and myself numbered 1,451,004 of April 10, 1923. In U. S. Barton Patent No. 1,351,091 of August 31, 1920, a process is set forth for producing zirconium cyanonitride by melting zirconium-containing materials with a carbonaceous reducing agent, and thereafter subjecting same to the action of a sulphate of an alkali metal to obtain zirconium oxide. In my U. S. Patent No. 1,494,426 of May 20, 1924, a process is set forth for converting the zirconium-containing material into zirconium sulphate from which the various compounds of zirconium may be thereafter derived.

Zirconium silicate even when milled to extreme fineness is not affected or decomposed to an appreciable extent either by hydrofluoric acid or prolonged heating with sulphuric acid and it has been necessary either to treat it by cyanonitride process or else to resort to any one of the several fusion schemes, such as fusion with a large excess of soda ash, or by fusion with sodium hydrate and sodium fluoride both of which are difficult and expensive commercial operations.

In the course of my experimental work relating to the production of fused zirconia ($ZrO_2$) by the process of heating zircon ($ZrSiO_4$) in the electric furnace to expulsion of the silica leaving the zirconium as a residue of fused $ZrO_2$, I discovered that even before the silica had been volatilized a change had occurred, yielding a horny, fused vitreous product having chemical properties entirely unlike the zirconium silicate introduced into the furnace. I also found that such fused product, if withdrawn at the initial stage of operation at the point where the fused mass still carried nearly the amount of $SiO_2$ in the original zircon introduced, would, if milled sufficiently fine, respond to solution of the zirconium in sulphuric acid, providing the mixture were heated at about 350–400° C. for about three hours. The amount of $H_2SO_4$ (93%) to be used in treating the fused product is about 1.75 to 2 parts by weight to one part of zirconium oxide in the fused material.

Hence my present invention is largely based upon my discovery that the zircon can be quickly and readily converted to an acid soluble form without the losses of zirconium incidental to the cyanonitride methods of decomposition; furthermore my improved methods are much simpler and more effective in operation as the residue in the furnace may be readily removed by tapping or quickly cooled in mass within the furnace in contact with air.

My invention, therefore, comprises simplified and cheaper methods for obtaining zirconium in solution preparatory to thereafter obtaining various derivative compounds useful in the industrial arts, whereby the native zirconium silicate is heated to fusion temperature with practically no, or only partial, expulsion of silica and the zirconium is thereby converted into a form which can be dissolved by simply milling the resulting fused product, then mixing it with a suitable quantity of sulphuric acid, and finally baking or heating the charge to a sufficiently high temperature.

The following example will serve to show how my invention may be practiced: Zirconium silicate sand having the following chemical composition:

| | Per cent. |
|---|---|
| Zirconium silicate ($ZrSiO_4$) | 96.09 |
| Titanium oxide ($TiO_2$) | 0.33 |
| Ferric oxide ($Fe_2O_3$) | 0.13 |
| Alumina ($Al_2O_3$) | 3.35 | is milled to a fine powder, and then well mixed with twice its weight of 66° Bé. sulphuric acid ($H_2SO_4$); then the mixture is heated for about three hours at approximately 400° C. and then taken up in water after cooling. This residue will be found to constitute the zirconium silicate as originally introduced with practically no solution or decomposition of the zircon having been accomplished by the treatment referred to.

However, I have discovered that when the zirconium silicate sand having substantially the chemical composition hereinbefore referred to is charged in an electric furnace to obtain a fused product which is thereafter cooled, then when such fused product is milled to a fine powder and mixed with twice its weight of sulphuric acid as before described, and this charge or mixture heated or baked at a temperature of from 350 to 450° C. for about three hours, and then cooled and leached with water that the zirconium readily dissolves leaving silica insoluble in the residue. I prefer to work at 400° C. as action appears to be as rapid and as complete at this temperature as at higher temperatures and the zirconium sulphate formed can be heated for long periods at this temperature and is quite stable whereas if a much higher temperature were used the zirconium sulphate $Zr(SO_4)_2$, will begin to decompose.

To further illustrate the nature of my invention, I give an analysis of natural zirconium silicate and also of fused zirconia obtained by heating natural zirconium silicate in an electric furnace to expulsion of most of the $SiO_2$ to show the effect of such improved methods.

| | Natural $ZrSiO_4$. | Electrically fused $ZrO_2$. |
|---|---|---|
| | Per cent. | Per cent. |
| Percent $SiO_2$ | 32.22 | 1.16 |
| Percent $ZrO_2$ | 63.87 | 95.03 |
| Percent $Fe_2O_3$ | 0.13 | 0.27 |
| Percent $TiO_2$ | 0.33 | 0.50 |
| Percent $Al_2O_3$ | 3.35 | 3.90 |

Approx. specific gravity 4.5 to 4.7, about 5.7.

The working range of my improved methods would result in a fused product which, when analyzed, will lie between these compositions since the essence of my invention lies in heating natural $ZrSiO_4$ to fusion with very little, only partial, or practically complete, expulsion of $SiO_2$, whereby a product is obtained quite different from the natural $ZrSiO_4$ with respect to its solubility in sulphuric acid.

Under certain conditions it may prove desirable to partially expel the silica from the fused product by acid before treating same as heretofore set forth so as to obviate the subsequent separation of a large amount of silica from the zirconium sulphate solution. This may be accomplished by mixing such fused product with a small amount of $H_2SO_4$ (50%), and then adding hydrofluoric acid and heat; most forms of silica are converted to silicon tetrafluoride which passes off in gaseous form with the zirconium etc. remaining as the sulphates. However such preliminary treatment is not essential, since it is a matter of choice under operating conditions whether it be cheaper to remove silica by volatilization during fusion, or whether it is more advantageous to cut the fusion step short of expulsion of silica and make the separation after dissolving the zirconium with acid followed by extraction with water.

I claim as my invention:

1. The method of converting natural zirconium silicate or zircon into an acid soluble zirconium compound which comprises fusing the zirconium silicate, mixing the fused product with not to exceed twice its weight of sulphuric acid, heating the charge to from 350 to 450° C., leaching the resultant product, and separating the soluble zirconium compound from the residue.

2. The method of converting natural zirconium silicate or zircon into an acid soluble zirconium compound which comprises fusing the zirconium silicate with partial expulsion of silica, mixing the fused product with not to exceed twice its weight of sulphuric acid, heating the charge to from 350 to 450° C., leaching the resultant product, and separating the soluble zirconium compound from the residue.

3. The method of converting natural zirconium silicate or zircon into an acid soluble zirconium compound which comprises fusing the zirconium silicate, mixing the fused product with not to exceed twice its weight of sulphuric acid, heating the charge to about 400° C. for about three hours, leaching the resultant product, and separating the soluble zirconium compound from the residue.

4. The method of converting natural zirconium silicate or zircon into an acid soluble zirconium compound which comprises fusing the zirconium silicate with partial expulsion of silica, mixing the fused product with not to exceed twice its weight of sulphuric acid, heating the charge to about 400° C. for about three hours, leaching the resultant product, and separating the soluble zirconium compound from the residue.

5. The method of converting natural zirconium silicate or zircon into an acid soluble zirconium compound which comprises heating the zirconium silicate to form a fused product, mixing the fused product with not to exceed twice its weight of sulphuric acid (93%), heating the charge to from 350 to 450° C., leaching the resulting product with water, and separating the soluble zirconium compound from the residue.

6. The method of converting natural zirconium silicate or zircon into an acid soluble zirconium compound which comprises heating the zirconium silicate with partial volatilization of the therein contained silica to form a fused product, mixing the fused product with not to exceed twice it weight of sulphuric acid (93%), heating the charge to from 350 to 450° C., leaching the resultant product with water, and separating the soluble zirconium compound from the residue.

7. The method of converting natural zirconium silicate or zircon into an acid soluble zirconium compound which comprises heating the zirconium silicate to form a fused product, milling the fused product to a finely divided powder, mixing the powdered product with not to exceed twice its weight of sulphuric acid (93%), heating the charge to from 350 to 450° C., leaching the resultant product with water, and separating the soluble zirconium compound from the residue.

8. The method of converting natural zirconium silicate or zircon into an acid soluble zirconium compound which comprises heating the zirconium silicate with partial volatilization of the therein contained silica to form a fused product, milling the fused product to a finely divided powder, mixing the powdered product with not to exceed twice its weight of sulphuric acid (93%), heating the charge to from 350 to 450° C., leaching the resultant product with water, and separating the soluble zirconium compound from the residue.

9. In the derivation of an acid soluble zirconium compound from zirconium silicate, the steps which consist in fusing the zirconium silicate to ensure the presence of some silica, mixing the fused product when finely divided with sulphuric acid, heating the charge to from 350 to 450° C., adding water to production of zirconium sulphate solution, and separating the soluble zirconium values therefrom.

10. In treating a zirconium ore to obtain an acid soluble zirconium compound, the steps which consist in fusing said ore to ensure the presence of some silica in the resultant product, mixing said product with not to exceed twice its weight of sulphuric acid, and heating the charge to from 350 to 450° C.

11. In treating a zirconium ore to obtain an acid soluble zirconium compound, the steps which consist in fusing said ore to ensure the presence of some silica in the resultant product, mixing said product with not to exceed twice its weight of sulphuric acid, and heating the charge to about 400° C. for about three hours.

12. In treating a zirconium ore to obtain an acid soluble zirconium compound, the steps which consist in fusing said ore with partial expulsion of silica in the resultant product, and mixing and heating said product with sulphuric acid at a temperature between 350° and 450° C.

13. A zirconium compound derived from a preliminary fusing of zirconium silicate and characterized as being soluble in sulphuric acid and as consisting by analysis preponderatingly of zirconia and also containing some silica, and as being the product resulting from heating said fused zirconium silicate mixed with an excess of sulphuric acid from 350° to 450° C.

14. A zirconium compound derived from a preliminary fusing of zirconium silicate and characterized as being soluble in sulphuric acid and as consisting by analysis preponderatingly of zirconia and also containing some silica the zirconium content increasing as the silica is decreased, and as being the product resulting from heating said fused zirconium silicate mixed with an excess of sulphuric acid from 350° to 450° C.

15. A zirconium compound derived from a preliminary fusing of zirconium silicate and characterized as being soluble in sulphuric acid and as consisting by analysis preponderatingly of zirconia and also containing some silica and traces of oxides of titanium and iron, and as being the product resulting from heating said fused zirconium silicate mixed with an excess of sulphuric acid from 350° to 450° C.

CHARLES J. KINZIE.